J. H. BRUEN.
Hand-Seeder.
No. 17,260.  Patented May 12, 1857.
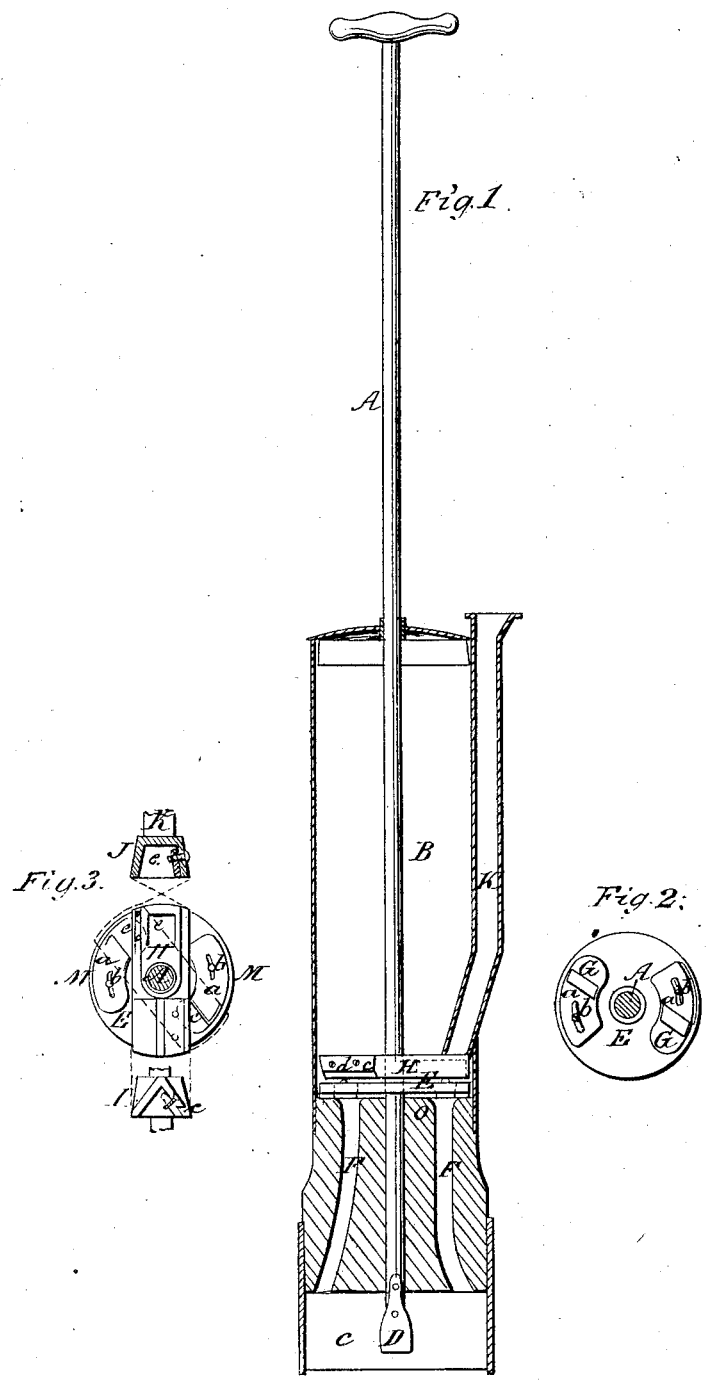

UNITED STATES PATENT OFFICE.

JOHN H. BRUEN, OF PENN YAN, NEW YORK.

IMPROVEMENT IN SEED-PLANTERS.

Specification forming part of Letters Patent No. 17,260, dated May 12, 1857.

*To all whom it may concern:*

Be it known that I, JOHN H. BRUEN, of Penn Yan, in the county of Yates and State of New York, have invented certain new and useful Improvements in Seed-Planters, and especially on the corn-planter for which Letters Patent were granted me on the 24th day of February, 1857; and I do hereby declare that the following is a full, clear, and exact description of the construction and operation of the same, reference being had to the accompanying drawings, making part of this specification, and to the letters of reference marked thereon.

The same letters refer to like parts in each of the figures.

Figure 1 represents a vertical section of my patented corn-planter with the improvements attached.

A is the staff; B, the seed-chamber; C, one of the blades, of which there are two of corresponding shape. The point of the blades being thrust into the earth, the staff receives a partial turn by the hand of the operator, when the wedge-shaped point D throws open the blades, which are made of flexible metal. Simultaneously with the opening of the blades the disk-distributer E, which is attached to the staff and moves with it, drops the seed, which descends through the apertures F F into the earth as penetrated by the blades. The blades spring back to their former position upon withdrawing the machine, and the earth falls back, covering the seed.

Such is substantially the operation of my patented seed-planter. My improvements on it are as follows:

In planting corn the kernels vary materially in size and shape, and it is sometimes desirable to drop a greater number in a hill than at others, as the quality of the seed or soil may determine. To effect this, and graduate it from broom-corn and other small seeds to the largest varieties of corn, I construct the drop-holes of my distributer as shown at G G, Fig. 2, having a semicircular form on one side and an oblique beveled slide-piece, *a*, upon the other. The slide is constructed of sheet iron, tin, or other metal, one end being bent below the disk-distributer, as at *i i*, Fig. 1, so as to sweep close to the top of the block O. It can be moved forward and back in the hole G, being held in its position by a screw, *b*, upon which it is adjustable by means of a slot.

Immediately above the distributer is placed a prism-shaped bar, H, hollow on the under side, through the center of which the staff passes. Fig. 3 presents a plan view of the upper side, and shows its position relative to the distributer. I is an elevation of one end and J of the opposite end, seen from a reverse position. This bar sits upon the distributer in the position shown by the outline M, Fig. 3, and does not close the drop-holes, except when the staff is turned to open the blades, when the holes in the distributer are brought in range with the apertures F F, Fig. 1, and the seed dropped.

Previous to turning the staff the seed to be planted rests upon the block O and in the drop-holes G G. The leather valves *c c* serve as cut-offs to the grain on turning the distributer, so that no seed falls except that which lies in the drop-holes. They are attached by screws to the inside of the shell or prism, and a rabbet is made in the edge of the same, as at *d*, Fig. 1. The leather, being slightly flexible, does not catch or crush the grain, and thereby obstruct the operation of the machine, as would an unyielding metallic edge. The prism-bar is stationary, being fixed in its position by the end of the square tube K being inserted in the hole *e*.

It is usual to insert a pumpkin-seed at intervals within the hill of corn, allowing several hills to intervene to give room for the vines to spread. The number of intervening hills is a matter of taste with the agriculturist, or he may be ruled by the fertility of the soil. It is generally done by going over the ground a second time, but very imperfectly, as the corn-hills are liable to become obliterated, and the pumpkin-seed introduced between the rows, where it would be destroyed by the cultivator after it had germinated. To effect this object I place on the outside of the seed-chamber the tube K, having a funnel-shaped top, into which the pumpkin-seeds can be readily dropped by the left hand of the operator. This tube enters the seed-chamber directly above the prism-bar H, which has a corresponding aperture, *e*, Fig. 3, and the drop-holes G being brought, in the act of planting the corn, in a line with the apertures *e* and F, the pumpkin-seed descends and is deposited simultaneously with the corn. This operation is entirely independent of the corn-planting, and can be repeated at every hill, or at the option of the operator, with certainty of success.

What I claim as my invention, and desire to secure by Letters Patent, is—

The tube K, in combination with bar H and disk-distributer E, arranged and operating in the manner and for the purpose set forth.

JOHN H. BRUEN.

Witnesses:
    EDWD. V. COULTON,
    J. FRASER.